United States Patent Office 3,445,170
Patented May 20, 1969

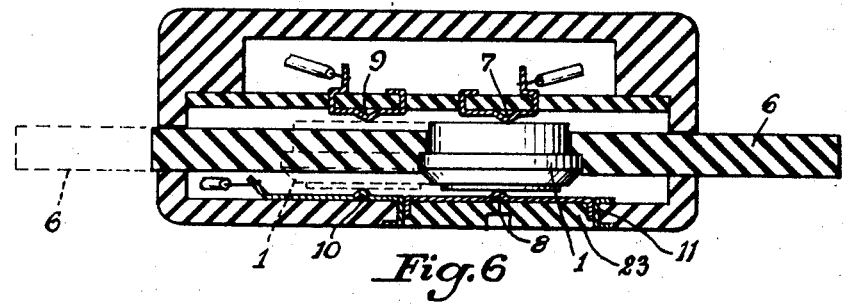
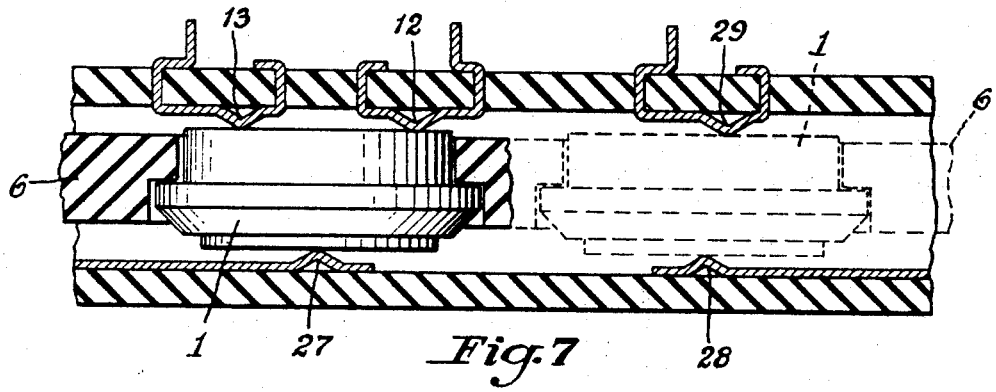
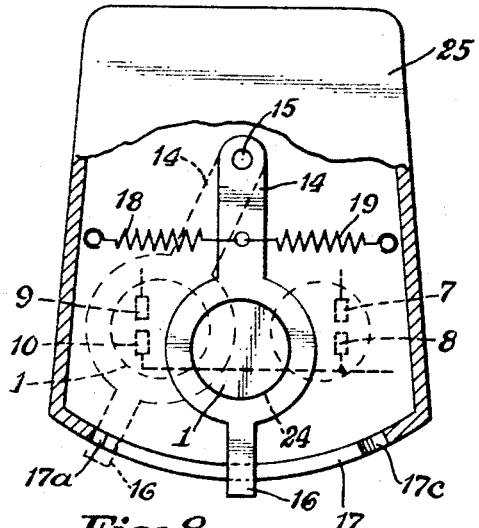
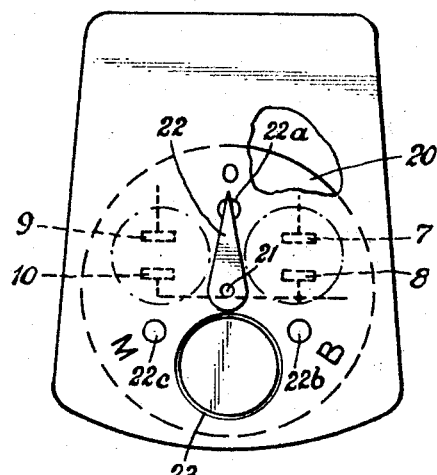
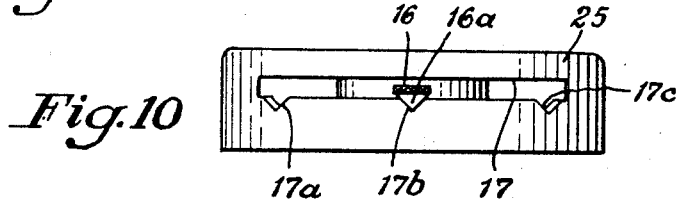

3,445,170
PHOTOELECTRIC EXPOSURE METER
Rolf Dietrich, Stuttgart, Dirk Ulffers, Stuttgart-Degerloch, and Hans Warstat, Stuttgart, Germany, assignors to Zeiss Ikon Aktiengesellschaft, Stuttgart, Germany
Filed Jan. 4, 1965, Ser. No. 423,158
Claims priority, application Germany, Jan. 18, 1964, 210,589
Int. Cl. G01j 1/44
U.S. Cl. 356—226                                              6 Claims

ABSTRACT OF THE DISCLOSURE

A photoelectric exposure meter employing a photoelectric resistance measuring instrument and a battery in an electric circuit. Another electric circuit is connected with said first mentioned electric circuit and the battery is movably arranged to be disconnected from said first circuit and connected in said other electric circuit so that the measuring instrument indicates the charge condition of the battery, while the electric circuit containing the photoelectric resistance is interrupted.

---

The invention relates to a photoelectric exposure meter of the type in which the measuring instrument in addition to measuring the light is also used for checking the charge condition of the battery which is exchangeably arranged between two contacts positioned in the exposure meter circuit.

It is known to separate the measuring instrument of an exposure meter from the measuring circuit by a change over switch and connecting it directly to the battery for checking the charge condition of the same. This has the disadvantage that the switch contacts which are connected with one another form transition resistances which may falsify the actual measuring value, the more so, as the currents in this measuring circuit are quite low. Since the change-over switch usually is only infrequently operated and as a rule remains in the position in which the measuring instrument has been connected with the photo resistance, an oxidation or soiling of the infrequently used contacts may occur which sooner or later prevents a contact making.

Since the battery must be exchangeably mounted to permit a convenient replacement, a pair of contacts in the measuring circuit cannot be avoided and here it is where the invention comes in.

It is the object of the invention to provide additional contacts for the battery in a circuit used for testing its voltage and means for transferring the battery to a position between these contacts when the voltage is to be tested.

In accordance with the invention, the light measuring and testing circuit is interrupted at a place where it has to be kept open anyway in order to insert the battery. The proposed transfer of the battery from between one contact pair to another contact pair destroys mechanically any oxide formation on the contacts so that a safe contact making for the position of the battery in the light measuring circuit as well as in the testing circuit is ensured.

In order to transfer the battery conveniently into one or the other circuit, it is connected with a change-over device which may consist of a reciprocating slide or carriage which, according to its position, may project from one or the other side of the exposure meter casing a distance corresponding approximately to the distance between the two contact pairs. There protrusions, however, are sometimes not practical so that it might be preferred to install the battery in a pivotally mounted slide.

The same may consist of a pivotally mounted lever whose free end serves as a handle which projects from the casing. For this purpose the casing of the exposure meter must be provided with a slot which, however, might be difficult to dust-proof. It is therefore another object of the invention to construct the pivotally mounted slide in the shape of a rotary disc whose axis of rotation lies at least approximately in the center of the exposure meter. Then the handle required for adjusting the rotary disc can be mounted on the rotary shaft on which the rotary disc is fixedly mounted. This provides a dust-proof construction of the casing. The handle is preferably formed as a pointer which in connection with marks applied to the outer face of the casing indicates the position of the revolving slide and therewith the position of the battery in the casing between either one of the two contact pairs.

With such a pivoted lever or rotary disc the battery may be shifted into a light measuring position or into a voltage testing position. If the battery is tested, the photoelectric resistance is disconnected from the battery. In the light measuring position the battery and photoelectric resistance are arranged in series so that current is extracted from the battery in dependence of the photoelectric resistance. Even if the photoelectric resistance is not energized by light at all, a certain current is flowing so that over a longer period of time a certain amount of electric energy is consumed. This can be avoided when the two contact pairs are arranged in such a distance from each other that in one position of the rotary disc which carries the battery the latter does not touch any of the two contact pairs. Preferably, the distance between the two contact pairs is so selected that the battery can be inserted in its carrier without touching the contact pairs. For this purpose the exposure meter casing is provided with an opening in the center region where the battery is spaced from the contact pairs. The battery is secured to its carrier, namely for instance by resilient means.

The pivotally mounted or rotary carrier can be locked in its light measuring and testing position or its zero or neutral position, respectively. It may be preferred to lock it only in one or the other position, for example in the zero or neutral position, while in the light measuring and testing position the battery and therewith the alternating carrier is held by the resilient contact pairs. An additional spring securing of the carrier is provided if the carrier is to be locked in a preferred position, for instance in the zero position.

The transfer of the battery from the light measuring position to the testing position may cause changes in the individual circuits which may impair a measurement or make it even impossible. For example, when the battery is transferred from the position 1' (FIG. 3) to the position 1 the measuring instrument 4 is short-circuited by the conductor lying parallel to it and the resistance 3 so that a light measuring is made impossible. It is therefore a further object of the invention to provide for a change in the circuit in dependence of the position of the carrier. For this purpose at least in one of the positions of the battery at least one of its poles is connected to two oppositely insulated contacts so that when the battery is transferred to this position at the same time an additional circuit is connected and on its removal from this position this circuit is disconnected.

The invention will be described in further detail in the following with reference to the accompanying drawings in which:

FIG. 6 illustrates a sectional view of a photoelectric exposure meter along a plane which passes through the contacts which are connectable with the terminals of the battery;

FIG. 7 is a sectional view of another embodiment of the photoelectric exposure meter of the invention;

FIG. 8 is a top plan view of a photoelectric exposure meter partly broken away to illustrate a pivotally mounted carrier for the battery, and FIG. 9 is a top plan view of still another photoelectric exposure meter of the invention in which the battery is mounted in a rotatable disc, and FIG. 10 is an end view of the exposure meter looking in the direction of the arrow X in FIG. 8.

Figure 1:
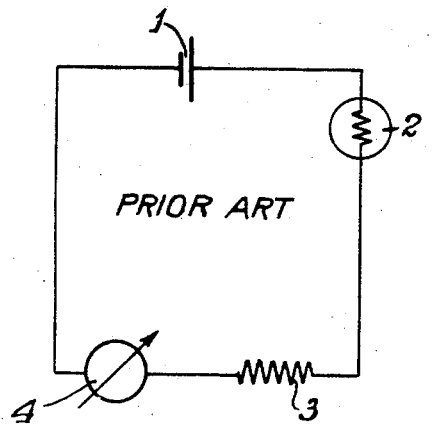
FIG. 1 illustrates diagrammatically the circuit of a conventional photoelectric exposure meter.

FIG. 1 discloses the basic circuit of an exposure meter comprising a battery 1, a photoelectric resistance 2, a fixed resistance 3 and a measuring instrument 4.

Figure 2:
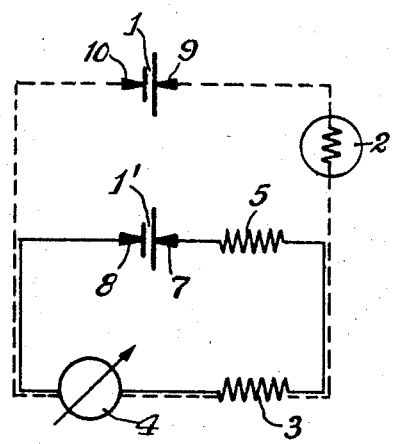
FIGS. 2, 3, 4 and 5 illustrate each a different circuit of a photoelectric exposure meter of the invention provided with means for testing the battery forming a part of the exposure meter.

FIG. 2 illustrates the manner in which the battery 1 for the purpose of checking its voltage is transferred from its conventional measuring position 1 to the testing or checking position 1' and in the latter is connected to contact elements which are arranged in the circuit shown in solid lines. The broken lines represent the circuit for the light measurement. The fixed resistance 3 serves among other things for compensating the exemplary dispersion of the photoelectric resistance 2. When checking the battery the resistance would cause different indications of the measuring instrument. Since it is desirable that during the testing of the battery the measuring instrument indicate a fixed value which is marked, the test circuit is provided with an additional resistance 5 which is selected of such a size that together with the resistance 3 it causes the measuring instrument to indicate a definite value provided the battery is not discharged.

It may be of advantage to arrange a resistance parallel to the measuring instrument during the testing of the battery, which resistance during the light measuring is arranged in series with the measuring instrument. In such a case the branch conductors a and b (see FIG. 3) must be separated from one another during the light measurement, or else the measuring instrument is short-circuited. In order not to have to provide an extra switch for this purpose, the two branch conductors a and b are separately conducted to the battery in such a manner that the two conductors are short-circuited at a terminal of the battery in the position 1' which is the test position. As soon as the battery is being transferred to the position 1, the conductors a and b are disconnected from the battery terminal.

Figure 4:
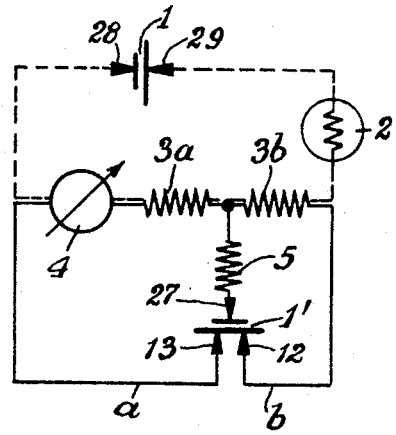

If a number of resistances are arranged in series in the measuring circuit and with the measuring instrument, then in the testing position when two resistances 3a and 3b are used, one of them, for instance 3a, may be arranged in series with the measuring instrument 4, and the other resistance 3b may be arranged in parallel to the measuring instrument, as is shown in FIG. 4.

Figure 5:
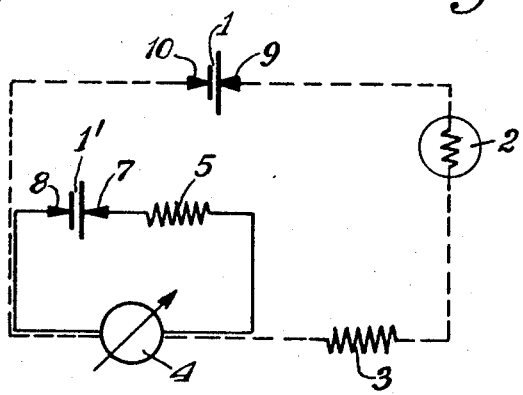

The light measuring operation and the battery testing operation may also be performed in accordance with the circuit arrangement illustrated in FIG. 5. The resistance 5 is effective only in the testing position of the battery and serves for the fixing of a predetermined indication of the measuring instrument. The illustrated circuits have in common that the battery for the purpose of light measuring is arranged in a different circuit from that which is used for testing the battery. The invention, however, is not limited to the described circuits. There may for example also be used a circuit in which is arranged parallel to the measuring instrument a resistance which is dependent on the voltage or the temperature.

FIG. 6 is a sectional view of an exposure meter casing. As battery 1 is used a so called button cell which is mounted in a reciprocating carrier 6. The carrier as illustrated is in its one extreme position. Then the battery 1 lies between the contacts 7 and 8. In the other extreme position of the carrier 6 the battery is placed between the contacts 9 and 10, as indicated in dash lines. The position of the contacts 7 to 10 is shown in the mentioned circuits which illustrate light measuring and battery testing positions. The contacts 8 and 10, i.e. the ones associated with one pole of the battery, may be made of one piece. One of the two positions of the battery 1 in the exposure meter casing is associated with the opening 11 for inserting and removing the battery, which opening usually is closed by a cover plate 23.

Figure 3:
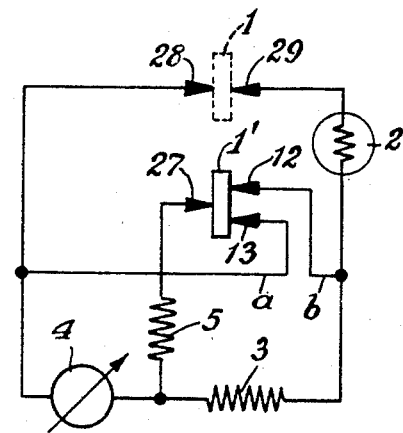

FIG. 7 illustrates the position of the double contacts 12 and 13 which have already been described in connection with the circuits according to FIGS. 3 and 4. One pole of the battery 1 is connected simultaneously with the contacts 12 and 13 arranged separately from each other. The other pole is engaged by the contact 27. In the operative position of the exposure meter the battery 1 is shifted to the dash line position to engage the contacts 28 and 29.

According to FIG. 8, the battery 1 is supported by a pivoted carrier 14 mounted on a shaft 15. By means of the handle 16 on the carrier 14 and protruding through a slot 17 of the casing of the exposure meter the pivoted carrier 14 is adjusted. Due to its construction and mounting the pivoted carrier 14 having the form of a lever arm is able to occupy a central or neutral position in which the battery 1 does not touch the contact pair associated with the light measurement circuit, nor is the contact pair engaged which is associated with the battery testing circuit. These contact pairs 7, 8 and 9, 10 respectively are placed so far apart that the battery 1 in the mentioned central position of the carrier 14 may conveniently be inserted through an opening 24 in a wall of the casing 25 without engaging the contact pairs. Preferably, two tension springs 18 and 19 are provided for automatically moving the carrier 14 from the light measuring or testing position, respectively, to the central position so that, as explained above, the battery when the exposure meter is not used does not lie in any of the two circuits and thereby the employment of an additional switch is avoided.

The handle 16 is provided with a lateral projection 16a (FIG. 10) adapted to engage suitable notch-like recesses 17a, 17b and 17c in the wall of the slot 17 to arrest the carrier in any one of its positions, left hand, center or right hand.

In the embodiment of FIG. 9 the carrier for the battery is formed by a rotary disc 20 which is mounted on a rotatable shaft 21 in the exposure meter casing. The shaft 21 has attached thereto a handle 22 in the shape of an indicator which cooperates with marks "O," "B" and "M" applied to the outer face of the exposure meter casing. The marks indicate the particular positions of the rotary disc. Adjacent to the marks O, B and M the outer face of the meter casing is provided with circular depressions 22a, 22b and 22c respectively, into which engages a lateral projection on the handle 22 to lock it resiliently in the desired position. The FIGS. 8 and 9 illustrate diagrammatically the position of the contacts 7 to 10 of FIG. 6.

What we claim is:

1. A photoelectric exposure meter including within a housing a measuring instrument, a first fixed resistance, a battery, a photoelectric resistance, and first circuit means for connecting said measuring instrument, first resistance, photoelectric resistance and battery in series, said first circuit means being provided with a first pair of spaced contact elements fixedly attached to said housing and to which the terminals of said battery are releasably connected, and a second circuit means including in series a second pair of spaced contact elements fixedly attached to said housing and a second fixed resistance, said second circuit means being connected in parallel to that portion of said first circuit means which includes in series said measuring instrument, said first fixed resistance and said first pair of spaced contact elements, means for moving said battery within said housing for selectively connecting the terminals of said battery slidably with either one of said two pairs of contact elements for performing light measurements and battery testing operations, respectively, and said means for moving said battery comprises a carrier movably mounted in said housing and in which said battery is mounted for being moved with its terminals into engagement with either one of said pairs of fixedly mounted contact elements.

2. A photoelectric exposure meter according to claim 1, including an extension on said carrier projecting from said housing, said extension forming a manually operable handle for moving said carrier and the battery thereon into the desired operative positions, and means for arresting said carrier in its adjusted positions.

3. A photoelectric exposure meter according to claim 1, in which said battery comprises a button battery provided on each of its opposite faces with a terminal for slidable engagement with said pairs of contact elements.

4. A photoelectric exposure meter according to claim 1, in which said carrier rotatably mounted in said housing and in which said battery is eccentrically mounted for being moved by said disc with its terminals into engagement with either one of said pairs of contact elements.

5. A photoelectric exposure meter according to claim 1, in which said two pairs of contact elements are spaced such a distance apart from each other that the terminals of said battery will be out of engagement with both pairs of contact elements when said carrier is in a position substantially midway between said pairs of contact elements.

6. A photoelectric exposure meter according to claim 1, including means for arranging said first fixed resistance in parallel with said measuring instrument in the battery test position, said means comprising a branch circuit including two branch conductors leading from said first circuit means separately to one terminal of said battery to be short circuited by said terminal in the test position of the battery, said two branch conductors being disconnected from said terminal and from each other when the battery is moved into the light measuring position.

References Cited

UNITED STATES PATENTS

| | | |
|---|---|---|
| 426,009 | 4/1890 | Hadlock _____ 200—60 X |
| 661,456 | 11/1900 | Lewis _____ 200—60 |
| 1,739,373 | 12/1929 | Race. |
| 2,091,762 | 8/1937 | Kuppenbender. |
| 3,085,149 | 4/1963 | Giwosky _____ 240—10.65 X |
| 3,133,703 | 5/1964 | Monrog. |
| 3,147,680 | 9/1964 | Stimson. |
| 3,180,209 | 4/1965 | Crandell. |
| 3,224,350 | 12/1965 | Stimson. |

JEWELL H. PEDERSEN, *Primary Examiner.*

W. A. SKLAR, *Assistant Examiner.*

UNITED STATES PATENT OFFICE
CERTIFICATE OF CORRECTION

Patent No. 3,445,170                                                              May 20, 1969

Rolf Dietrich et al.

It is certified that error appears in the above identified patent and that said Letters Patent are hereby corrected as shown below:

In the heading to the printed specification, line 8, "210,589" should read -- Z 10589 --.

Signed and sealed this 21st day of April 1970.

(SEAL)
Attest:

Edward M. Fletcher, Jr.                              WILLIAM E. SCHUYLER, JR.
Attesting Officer                                          Commissioner of Patents